United States Patent [19]

Shim

[11] Patent Number: 5,592,224
[45] Date of Patent: Jan. 7, 1997

[54] DEVICE FOR ROTATING LIQUID CRYSTAL DISPLAY COUPLED TO CAMCORDER

[75] Inventor: Kwan Bo Shim, Seoul, Rep. of Korea

[73] Assignee: LG Electronics Inc., Seoul, Rep. of Korea

[21] Appl. No.: 420,559

[22] Filed: Apr. 12, 1995

[30] Foreign Application Priority Data

Apr. 14, 1994 [KR] Rep. of Korea .................. 7824/1994

[51] Int. Cl.$^6$ .................................................. H04N 5/225
[52] U.S. Cl. ........................... 348/333; 348/373; 348/375
[58] Field of Search ................................. 348/333, 334, 348/373, 375, 376; 358/906

[56] References Cited

U.S. PATENT DOCUMENTS

| 4,757,388 | 7/1988 | Someya et al. ........................ 348/333 |
| 5,442,453 | 8/1995 | Takagi et al. ......................... 348/374 |

FOREIGN PATENT DOCUMENTS

| 61-150474 | 7/1986 | Japan ............................. H04N 5/225 |
| 62-036985 | 2/1987 | Japan ............................. H04N 5/225 |
| 63-027169 | 2/1988 | Japan ............................. H04N 5/225 |

*Primary Examiner*—Wendy Garber
*Attorney, Agent, or Firm*—Birch, Stewart, Kolasch & Birch, LLP

[57] ABSTRACT

A device for rotating a liquid crystal display coupled to a camcorder, capable of safely protecting the liquid crystal display, eliminating any protruded portion of the camcorder, and rotating the liquid crystal display in any directions, thereby taking a moving picture at any positions of the camcorder. The camcorder includes a lens barrel longitudinally extending through an upper portion of an interior of the camcorder body, the lens barrel having a plurality of lenses, an outer lens mounted to one end of the lens barrel, a cylindrical slip ring fitted around an outer surface of the lens barrel, a rotating body fitted around the end portion of the lens barrel surrounded by the slip ring between the outer lens and the camcorder body such that it can rotate about the lens barrel, a rectangular liquid crystal display coupled to the rotating body, the liquid crystal display having the same width and thickness as those of the rotating body, and a liquid crystal display rotating unit for rotating the liquid crystal display with respect to the rotating body.

7 Claims, 3 Drawing Sheets

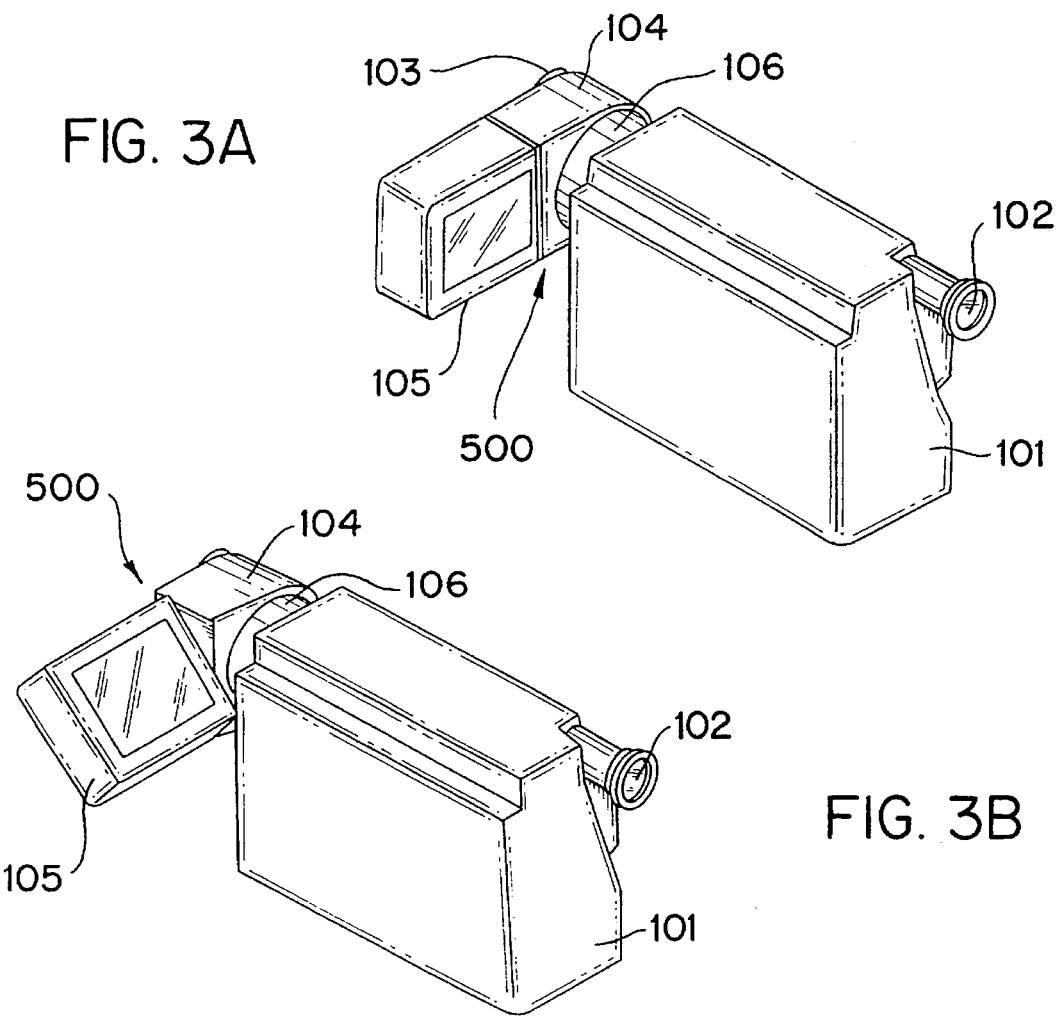
FIG. 3A
FIG. 3B
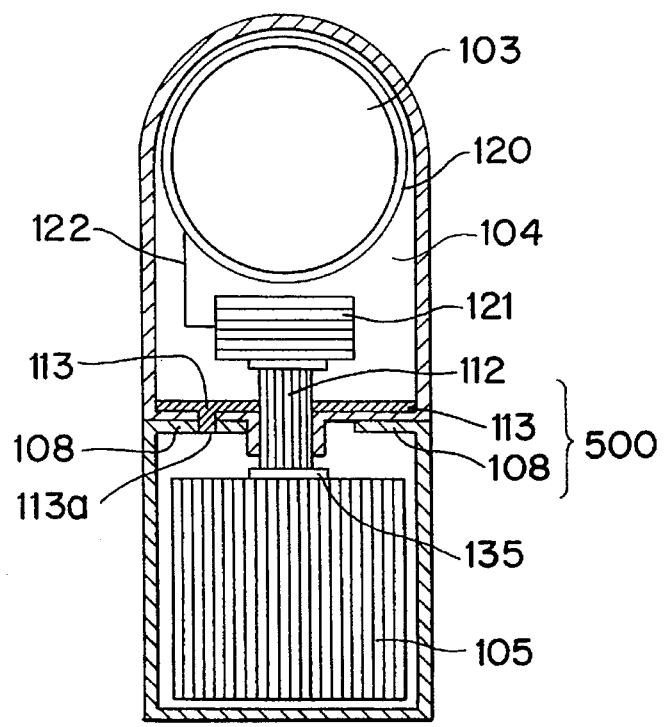
FIG. 4A

DEVICE FOR ROTATING LIQUID CRYSTAL DISPLAY COUPLED TO CAMCORDER

BACKGROUND OF THE INVENTION

1. Field of the Invention

The present invention relates to a device for rotating a liquid crystal display coupled to a camcorder, and more particularly to a device for rotating a liquid crystal display coupled to a camcorder, capable of rotatably mounting the liquid crystal display at an area defined beneath a protruded portion of a lens of the camcorder, thereby safely protecting the liquid crystal display at an unused state of the liquid crystal display and increasing the rotating angle of the liquid crystal display.

2. Description of the Prior Art

FIG. 1 is a perspective view showing a liquid crystal display mounted to a conventional camcorder.

As shown in FIG. 1, the conventional camcorder includes a camcorder body 1, a camera unit 10 provided with a view finder 2, and a liquid crystal display unit 20 provided with a liquid crystal display 3 used to determine a picture composition of an object or adjust the focus.

The liquid crystal display unit 20 is mounted to the camcorder body 1 such that it can rotate about the camcorder body 1 in directions indicated by the arrows in FIG. 1.

Generally, such a conventional camcorder is constructed such that a user shoots a moving picture under a condition that he holds the camcorder body 1 in his hands. In particular, the camcorder is constructed such that the user rotates the liquid crystal display unit 20 through an angle up to 270° by his hand, thereby enabling the liquid crystal display 3 to be rotated.

In this camcorder, the rotating range of the liquid crystal display 3 coupled to the camcorder body 1 is determined depending on the construction for rotating the liquid crystal display 3 and the mounted position of the liquid crystal display 3.

This camcorder is also constructed to rotate the liquid crystal display through an angle not less than 180° upon taking a moving picture of a back view or a picture of him. In this case, however, the image of object displayed on the liquid crystal display is viewed in an inverted manner. To this end, a separate circuit for inverting the image should be equipped in the camcorder.

As apparent from the above description, the conventional camcorder has a limitation on taking a picture of an object positioned at a small angle with respect to the camcorder body or taking a picture of a back angle view because the liquid crystal display can not rotate freely in various directions upon determining a picture composition of an object or adjusting the focus by adjusting the rotating angle of the liquid crystal display depending on the position of the object.

SUMMARY OF THE INVENTION

Therefore, an object of the invention is to provide a device for rotating a liquid crystal display coupled to a camcorder, capable of safely protecting the liquid crystal display at an unused state of the liquid crystal display and of taking a moving picture of an object at various angles.

In accordance with the present invention, this object can be accomplished by providing a camcorder comprising: a camcorder body; a lens barrel longitudinally extending through an upper portion of an interior of the camcorder body, the lens barrel having a plurality of lenses; an outer lens mounted to one end of the lens barrel; a cylindrical slip ring fitted around an outer surface of the lens barrel; a rotating body fitted around the end portion of the lens barrel surrounded by the slip ring between the outer lens and the camcorder body such that it can rotate about the lens barrel; a rectangular liquid crystal display coupled to the rotating body, the liquid crystal display having the same width and thickness as those of the rotating body; and liquid crystal display rotating means for rotating the liquid crystal display with respect to the rotating body.

BRIEF DESCRIPTION OF THE DRAWINGS

Other objects and aspects of the invention will become apparent from the following description of embodiments with reference to the accompanying drawings in which:

FIG. 3A is a perspective view illustrating a 90°-rotated state of a rotating body of the device of FIG. 2A obtained by rotating the rotating body from the state of FIG. 2B;

FIG. 3B is a perspective view illustrating a 30°-rotated state of the liquid crystal display obtained by rotating the liquid crystal display from the state of FIG. 3A;

FIG. 4A is a sectional view illustrating a coupled condition between the rotating body and the liquid crystal display in the device of FIG. 2A;

DETAILED DESCRIPTION OF THE PREFERRED EMBODIMENTS

Figure 1:
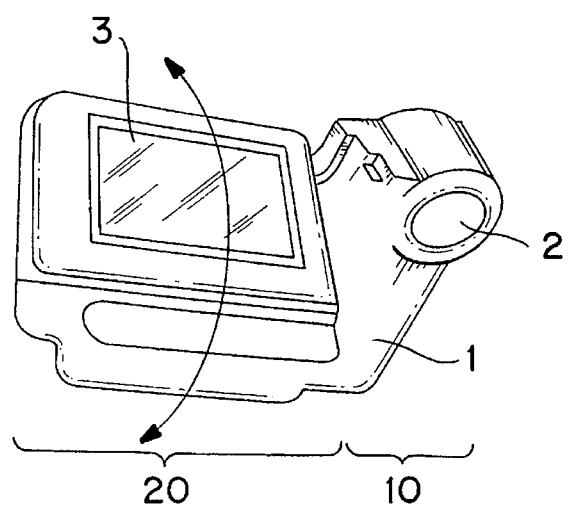
FIG. 1 is a perspective view illustrating a liquid crystal display rotatably mounted to a conventional camcorder.
Figure 2A:
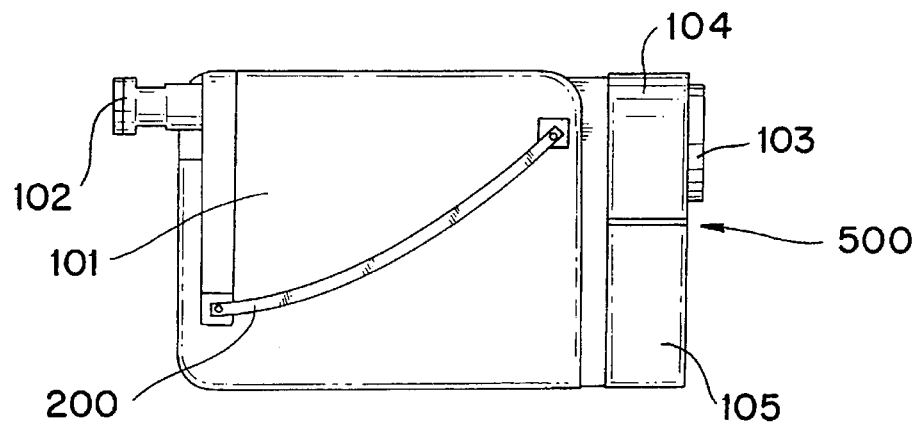
FIG. 2A is a side view illustrating a camcorder equipped with a liquid crystal display rotating device in accordance with the present invention.
Figure 2B:
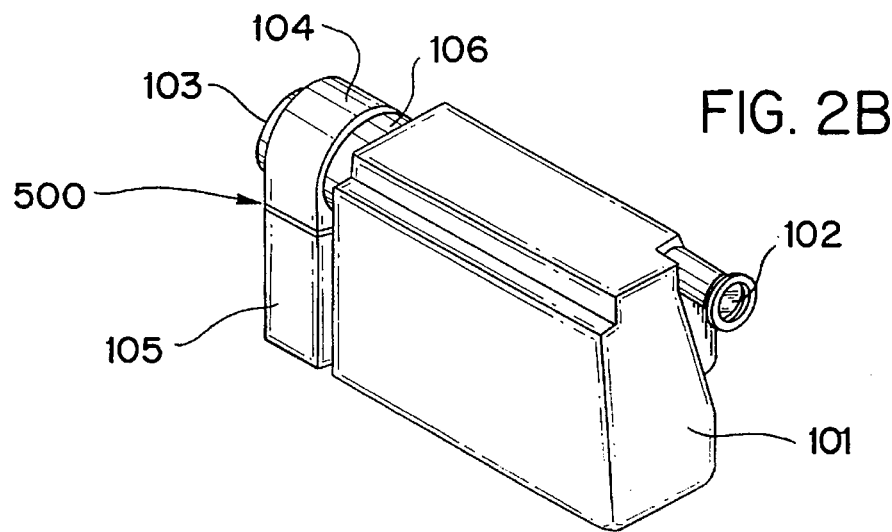
FIG. 2B, is a perspective view illustrating the camcorder of FIG. 2A.

FIGS. 2A and 2B illustrate a device for rotating a liquid crystal display coupled to a camcorder in accordance with the present invention, respectively.

As shown in FIG. 2A, the camcorder equipped with the rotating device of the present invention includes a camcorder body 101 and a hand holder 200 mounted at its both ends to one side wall of the camcorder body 101. The hand holder 200 enables a user to shoot a moving picture of an object under a condition that he holds the camcorder body 101 in his one hand held by the hand holder 200.

A lens barrel provided with a plurality of lenses (not shown) extends longitudinally through an upper portion of the interior of the camcorder body 101, as shown in FIG. 2B. A view finder 102 is mounted to one end of the lens barrel 106 whereas a lens 103 is mounted to the other end of the lens barrel 106.

Around the end portion of the lens barrel 106 supporting the lens 103, a rotating body 104 is fitted such that it can rotate about the lens barrel 106. The rotating body 104 includes a circular upper portion fitted around the lens barrel

106 and a rectangular lower portion extending from the circular portion.

The lower portion of the rotating body 104 is provided with a rectangular liquid crystal display 105 having the same width and thickness as those of the rotating body 104. The liquid crystal display 105 is rotatably mounted at its one side end to the lower end of the rotating body 104 by means of a liquid crystal display rotating unit 500.

As shown in FIGS. 4A to 4D, the liquid crystal display rotating unit 500 includes a stopper 113 adapted to control the rotation of the liquid crystal display 105 carried out about a bundle of connection lines 112 extending between the rotating body 104 and the liquid crystal display 105. The stopper 113 has a protrusion 113a protruded from one surface of the stopper 113. The liquid crystal display rotating unit 500 also includes a stopper guide 108 provided with a guide slot 108a for guiding the protrusion 113a of the stopper 113.

That is, the rotating body 104 and the liquid crystal display 105 are coupled to each other under a condition that the protrusion 113a provided at the stopper 113 is received in the guide slot 108a of the stopper guide 108.

A cylindrical slip ring 120 is fitted around the outer surface of the lens barrel 106 surrounded by the rotating body 104 such that it is partially exposed to the interior of the rotating body 104. Disposed in the interior of the rotating body 104 are connecting pins 122 coupled to a connection circuit board 121 for amplifying an image signal. The connecting pins 122 are in slidable contact with the exposed portion of the rotating body 104.

It is preferred that the connecting pins 122 are made of a material exhibiting a good conductivity and a good contact property.

The construction of the slip ring 120 will now be described in more detail in conjunction with FIG. 4B.

Figure 4B:
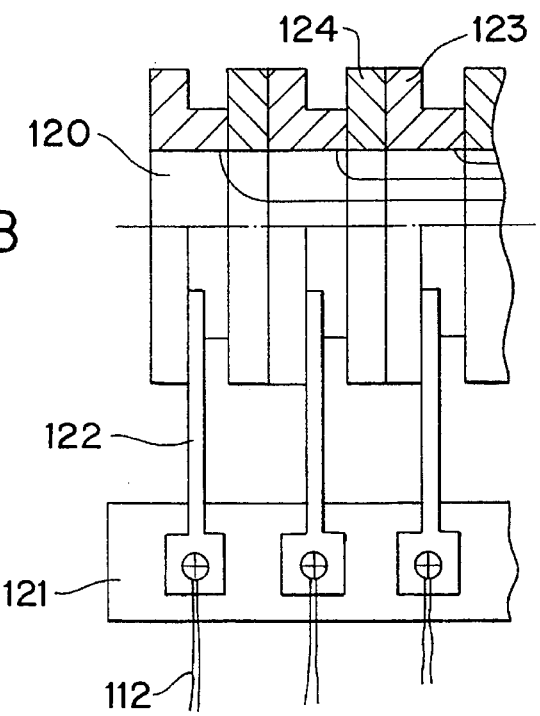
FIG. 4B is a sectional view illustrating a detailed construction of a slip ring constituting a part of the device of FIG. 2A in accordance with the present invention.
Figure 4C:
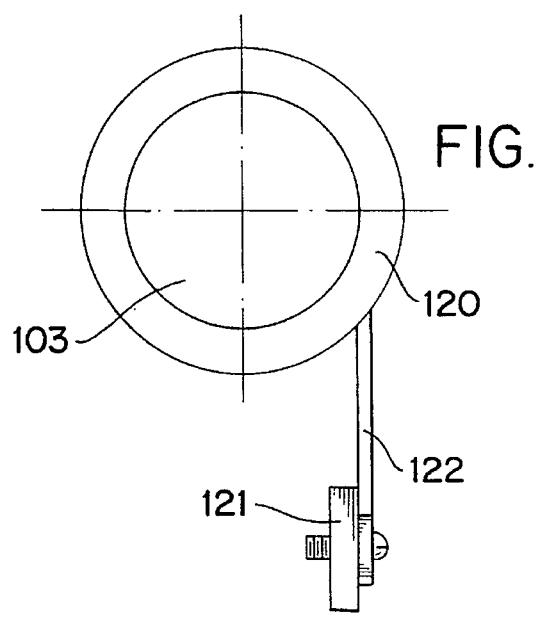
FIG. 4C is a side view illustrating the slip ring.

As shown in FIG. 4B, the slip ring 120 includes a plurality of brass members 123 made of brass exhibiting a good conductivity, and a plurality of insulating members 124 each disposed between adjacent brass members 123 and adapted to insulate signals generated from the adjacent brass members 123 from each other. The connecting pins 122 coupled to the connection circuit board 121 are in contact with the brass members 123, respectively. By this construction, the signals from the brass members 123 are transferred to the connection circuit board 121 via the connecting pins 122, respectively.

In order to amplify the outputs from the slip ring 120, the connection circuit board 121 is equipped with an amplifying circuit. The connection lines 112 extend from a lower surface of the connection circuit board 121 so that they are coupled to a connector 135 fixed to one side surface of the liquid crystal display 105.

In the camcorder having the above-mentioned construction, image signals received to the slip ring 120 is sent to the amplifying circuit of the connection circuit board 121 and then amplified in the amplifying circuit. The signals are then transferred to the liquid crystal display 105 via the connection lines 112 and the connector 135, respectively, so that the user can view an image displayed on the liquid crystal display 105.

FIG. 3A is a perspective view showing a 90°-rotated state of the rotating body obtained by rotating the rotating body from the state of FIG. 2B. On the other hand, FIG. 3B is a perspective view showing a 30°-rotated state of the liquid crystal display obtained by rotating the liquid crystal display from the state of FIG. 3A.

Now, operation of the rotating device having the above-mentioned construction will be described.

During a user shoots a moving picture of an object using the camcorder with the rotating device of the present invention, a transfer of image signals is achieved by the slide contact of the connecting pins 122 fixed to the connection circuit board 121 with the slip ring 120 fitted around the outer surface of the lens barrel 106.

When the angle of the liquid crystal display 105 is to be varied, for example, from the state of FIG. 2B to the state of FIG. 3B, the rotating body 104 is first rotated about the lens barrel 106, as shown in FIG. 3A. At this time, the slip ring 120 is maintained at its fixed state while the connecting pins 122 and connection circuit board 121 rotates about the lens barrel 106. Thereafter, the liquid crystal display 105 rotates with respect to the rotating body 104, as shown in FIG. 3B. At this time, the protrusion 113a protruded from one surface of the stopper 113 mounted on the lower surface of the rotating body 104 moves along the guide slot 108a of the stopper guide 108 mounted to one side surface of the liquid crystal display 105, thereby guiding the rotation of the liquid crystal display 105.

Figure 4D:
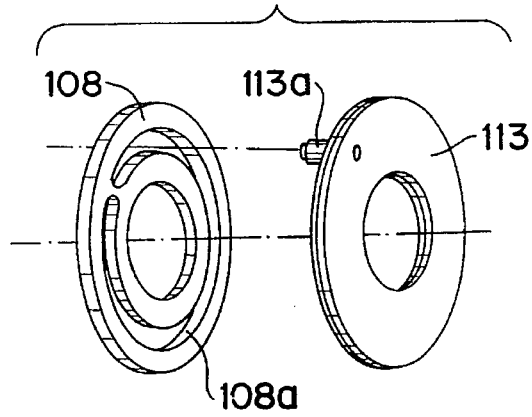
FIG. 4D is a perspective view illustrating a stopper constituting a part of the device of FIG. 2A in accordance with the present invention.

As shown in FIG. 4D, the guide slot 108a of the stopper guide 108 has a substantially circular, but unlooped shape. By virtue of such a shape, the rotating angle of the liquid crystal display 105 is limited to an angle less than 360°. Accordingly, the connection lines 112 are not entangled in any case.

Although the slip ring has been described as being used at the coupling area between the lens 103 and the rotating body 104, it may also be used at the coupling area between the rotating body 104 and the liquid crystal display 105. The stopper construction may also be used at both the above-mentioned areas.

Since the liquid crystal display rotating device enables the liquid crystal display to rotate in any directions, there is no situation that the image of an object is displayed under an inverted condition. Therefore, the liquid crystal display rotating device of the present invention has an advantage of requiring no separate circuit for inverting the image.

As apparent from the above description, the present invention provides a device for rotating a liquid crystal display coupled to a camcorder, capable of attaching the liquid crystal display at an area defined beneath a protruded portion of a lens of the camcorder, thereby safely protecting the liquid crystal display which may be easily broken and eliminating any protruded portion of the camcorder, and capable of rotating the liquid crystal display in any directions, thereby taking a moving picture at any positions of the camcorder.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A camcorder comprising:

a camcorder body;

a lens barrel longitudinally extending through an upper portion of an interior of the camcorder body, the lens barrel having a plurality of lenses;

an outer lens mounted to one end of the lens barrel;

a cylindrical slip ring fitted around an outer surface of the lens barrel;

a rotating body fitted around the end portion of the lens barrel surrounded by the slip ring between the outer lens and the camcorder body such that it can rotate about the lens barrel;

a rectangular liquid crystal display coupled to the rotating body, the liquid crystal display having the same width and thickness as those of the rotating body; and liquid crystal display rotating means for rotating the liquid crystal display with respect to the rotating body.

2. A camcorder in accordance with claim 1, wherein the liquid crystal display rotating means comprises:

a stopper adapted to control the rotation of the liquid crystal display carried out about a bundle of connection lines extending between the rotating body and the liquid crystal display, the stopper having a protrusion protruded from one surface of the stopper; and a stopper guide provided with a guide slot for guiding the protrusion of the stopper.

3. A camcorder in accordance with claim 2, wherein the guide slot has an unlooped construction having opposite ends not connected with each other so that it prevents the liquid crystal display from rotating through an angle corresponding to one rotate or above.

4. A camcorder in accordance with claim 1, further comprising:

connecting pins disposed in an interior of the rotating body beneath the slip ring and coupled to a connection circuit board for amplifying an image signal, the connecting pins being constructed to be in slidable contact with the rotating body and rotate together with the connection circuit board during a rotation of the rotating body at a fixed state of the slip ring.

5. A camcorder in accordance with claim 4, wherein the connecting pins are made of a material exhibiting a good conductivity and a good contact property.

6. A camcorder in accordance with claim 1, further comprising a hand holder mounted to one side surface of the camcorder body and adapted to enable a user to shoot a moving picture of an object under a condition that he holds the camcorder body in his one hand held by the hand holder.

7. A camcorder in accordance with claim 1, further comprising:

a slip ring mounted to an area between the rotating body and the liquid crystal display;

a pair of stoppers respectively mounted to the area between the rotating body and the liquid crystal display to control the rotation of the liquid crystal display with respect to the rotating body and an area between the outer lens and the rotating body to control the rotation of the rotating body with respect to the outer lens, each of the stoppers having a protrusion protruded from one surface of the stopper; and a pair of stopper guides respectively provided with guide slots for guiding the protrusions of the corresponding stoppers.

* * * * *